US008648496B2

(12) United States Patent
Carralero et al.

(10) Patent No.: US 8,648,496 B2
(45) Date of Patent: Feb. 11, 2014

(54) RECONFIGURABLE MICROGRID DIRECT CURRENT INTERFACE

(75) Inventors: Michael A. Carralero, Huntington Beach, CA (US); Jimmy M. Quiambao, Walnut, CA (US)

(73) Assignee: The Boeing Company, Chicago, IL (US)

( * ) Notice: Subject to any disclaimer, the term of this patent is extended or adjusted under 35 U.S.C. 154(b) by 567 days.

(21) Appl. No.: 12/944,433

(22) Filed: Nov. 11, 2010

(65) Prior Publication Data

US 2012/0119586 A1    May 17, 2012

(51) Int. Cl.
   *H02J 1/00*    (2006.01)
(52) U.S. Cl.
   USPC .......................................................... 307/80
(58) Field of Classification Search
   USPC ............................................................. 307/80
   See application file for complete search history.

(56) References Cited

U.S. PATENT DOCUMENTS

| | | |
|---|---|---|
| 2002/0135338 A1 | 9/2002 | Hobrecht et al. |
| 2005/0275290 A1 | 12/2005 | Inn et al. |
| 2006/0077604 A1 | 4/2006 | Jansen |
| 2007/0236287 A1 | 10/2007 | Bernacchia et al. |
| 2011/0006600 A1* | 1/2011 | Fontana et al. ................. 307/25 |

FOREIGN PATENT DOCUMENTS

| | | |
|---|---|---|
| EP | 0724327 A1 | 7/1996 |
| WO | 2009034420 A2 | 3/2009 |

OTHER PUBLICATIONS

Bunduhewa, P.J., "MicroGrid Power Electronics Interface for Photovoltaics", proceedings of: Power, Electronics, Machines and Drives, Apr. 2-4, 2008, York St. John University College, York, UK, pp. 260-264.
Kakigano, H. "Fundamental Characteristics of DC Microgrid for Residential Houses with Cogeneration System in Each House", proceedings of: Power and Energy Society General Meeting—Conversion and Delivery of Electrical Energy in the $21^{st}$ Century, 2008 IEEE, Jul. 20-24, 2008, Pittsburgh, PA, pp. 1-8.
International Search Report & Written Opinion dated Jun. 27, 2012 in PCT Application No. PCT/11/52198.

* cited by examiner

*Primary Examiner* — Robert L. Deberadinis
(74) *Attorney, Agent, or Firm* — Hope Baldauff, LLC

(57) ABSTRACT

Technologies are described herein for synchronizing multiple direct current ("DC") voltages provided by multiple power sources. Multiple input voltages are received from multiple power sources. A voltage control signal indicating a desired output voltage is issued to multiple DC-DC converter modules electrically coupled to the multiple power sources. A master DC-DC converter module from the multiple DC-DC converter modules converts a master input voltage to a master output voltage that is substantially equal to the desired output voltage. The master output voltage is then provided to the remaining multiple DC-DC converter modules. Each of the remaining multiple DC-DC converter modules then converts a slave input voltage to a slave output voltage that is substantially equal to the master output voltage.

20 Claims, 5 Drawing Sheets

RECONFIGURABLE MICROGRID DIRECT CURRENT INTERFACE

BACKGROUND

Existing energy systems, especially hybrid energy systems, utilizes hybrid inverters that are limited in size, unsuitable for scalability, and generally do not feature "plug & play" capabilities. Moreover, existing hybrid inverters are available for low end power systems of approximately 20 KW or less with direct current ("DC") input voltage ranges normally limited to less than 50 V dc. In many existing power system designs, multiple DC voltage sources are combined to provide a common DC voltage output. The conventional design strategy is to use power diodes or bulk resistors. However, using diodes or bulk resistors introduce huge losses when the DC voltage differences and variations among the DC voltage sources are significant.

It is with respect to these considerations and others that the disclosure made herein is presented.

SUMMARY

Technologies are described herein for synchronizing multiple direct current ("DC") voltages provided by multiple power sources. A reconfigurable DC interface is configured to receive differing DC voltages from multiple power sources, convert the DC voltage from one of the power sources to a desired output voltage, and, using the desired output voltage as a reference, convert the DC voltage from each of the remaining power sources to the desired output voltage. The multiple output voltages associated with the power sources may then be combined to provide a combined desired output voltage. In this way, the reconfigurable DC interface allows multiple DC power sources providing differing voltage levels and/or frequencies to operate as a constant voltage source.

Through the utilization of the technologies and concepts presented herein, hybrid systems that utilize multiple, renewable power sources to provide a single, constant DC voltage may do so without the huge electrical power losses associated with existing hybrid systems. By utilizing the reconfigurable DC interface that includes multiple synchronized DC-DC converter modules, input voltages having different voltage levels and/or frequencies may be converted to produce a synchronized output voltage at a desired voltage level and frequency. The use of the reconfigurable DC interface reduces the need for power diodes and bulk resistors that contribute to electrical losses in existing systems. As a result, the present disclosure provides technologies for improving energy efficiency, while reducing the size and/or number of electrical components required for converting voltages provided by multiple power sources to an output voltage that is substantially equal to a desired output voltage.

In one embodiment, a method for synchronizing voltages of multiple power sources is presented herein. The method includes receiving multiple input voltages from multiple power sources. A voltage control signal indicating a desired output voltage is issued to multiple DC-DC converter modules electrically coupled to the multiple power sources. A master DC-DC converter module from the multiple DC-DC converter modules converts a master input voltage to a master output voltage that is substantially equal to the desired output voltage. The master output voltage is then provided to the remaining multiple DC-DC converter modules. Each of the remaining multiple DC-DC converter modules then converts a slave input voltage to a slave output voltage that is substantially equal to the master output voltage.

In another embodiment, a reconfigurable DC interface includes a controller and multiple DC-DC converter modules. The controller provides a control signal that may indicate a desired output voltage or designate a candidate DC-DC converter module as a master DC-DC converter module. The master DC-DC converter module is configured to receive a first input voltage, convert the first input voltage to a first output voltage that is substantially equal to the desired output voltage, and provide the first output voltage to the remaining DC-DC converter modules. Each of the remaining DC-DC converter modules is configured to receive a respective slave input voltage and the first output voltage. The remaining DC-DC converter module then converts the slave input voltage to a slave output voltage that is substantially equal to the first output voltage.

In yet another embodiment, a reconfigurable DC interface system includes a controller configured to issue a control signal indicating a desired output voltage. A first DC-DC converter module of the reconfigurable DC interface system receives a first input voltage from a first power source and the control signal from the controller. The first DC-DC converter module converts the first input voltage to a first output voltage that is substantially equal to the desired output voltage, and provides the first output voltage to a second DC-DC converter. The second DC-DC converter receives a second input voltage from a second power source and the control signal from the controller. The second DC-DC converter module converts the second input voltage to a second output voltage that is substantially equal to the first output voltage. The reconfigurable DC interface system also includes a voltage output terminal that synchronizes the second output voltage and the first output voltage to produce a combined output voltage and provides the combined output voltage to an electrical component electrically coupled to the voltage output terminal.

It should be appreciated that the above-described subject matter may also be implemented in various other embodiments without departing from the spirit of the disclosure. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

Figure 1:
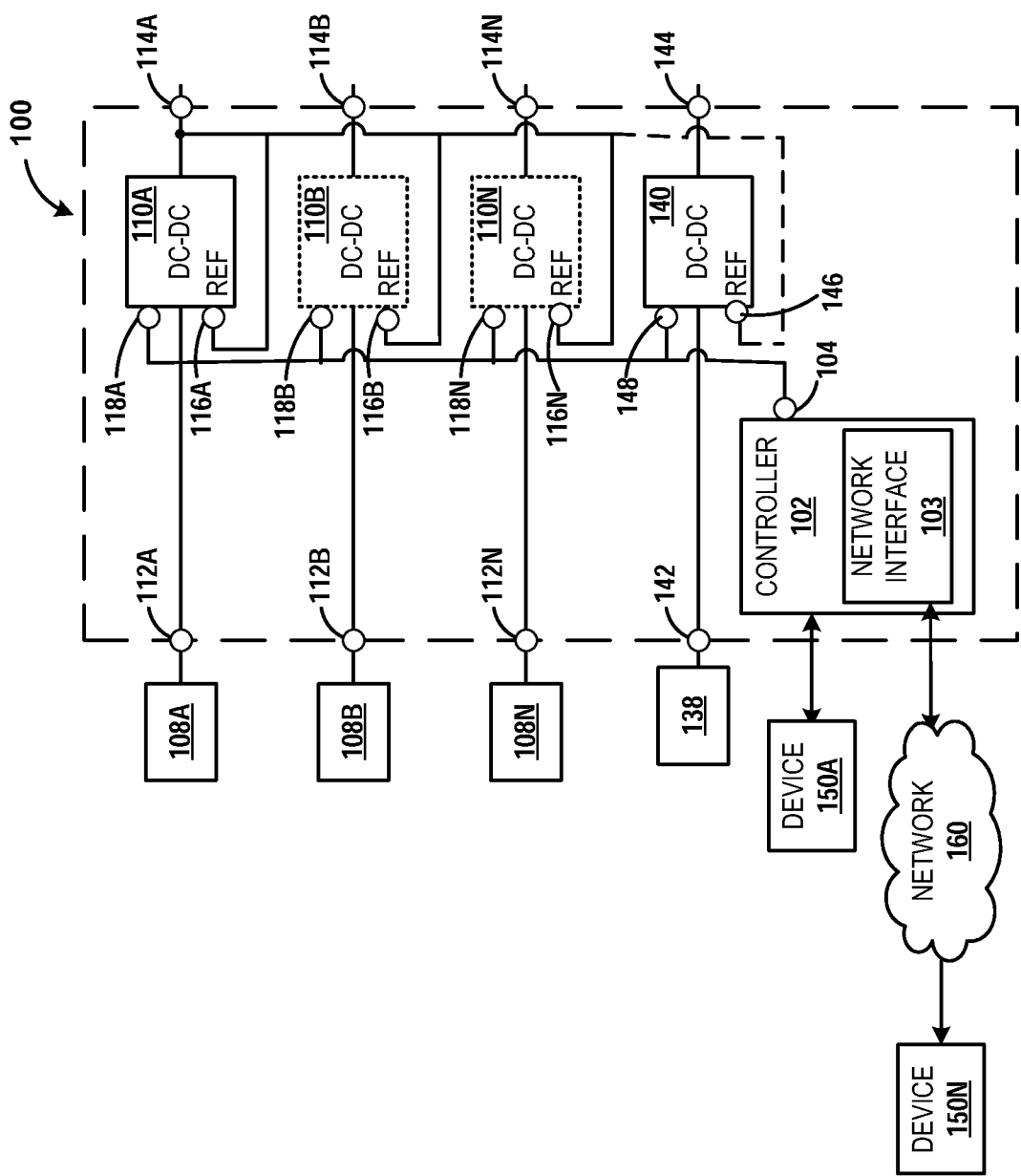
FIG. 1 is a schematic diagram of a circuit including a reconfigurable DC interface, in accordance with some embodiments.

Technologies are described herein for synchronizing multiple direct current ("DC") voltages provided by multiple power sources. A reconfigurable DC interface is configured to receive differing DC voltages from multiple power sources, convert the DC voltage from one of the power sources to a desired output voltage, and, using the desired output voltage as a reference, convert the DC voltage from each of the remaining power sources to the desired output voltage. The multiple output voltages associated with the power sources may then be combined to provide a combined desired output voltage. In this way, the reconfigurable DC interface allows multiple DC power sources providing differing voltage levels and/or frequencies to operate as a constant voltage source.

Through the utilization of the technologies and concepts presented herein, hybrid systems that utilize multiple, renewable power sources to provide a single, constant DC voltage may do so without the huge electrical power losses associated with existing hybrid systems. By utilizing the reconfigurable DC interface that includes multiple synchronized DC-DC converter modules, input voltages having different voltage levels and/or frequencies may be converted to produce a synchronized output voltage at a desired voltage level and frequency. The use of the reconfigurable DC interface reduces the need for power diodes and bulk resistors that contribute to electrical losses in existing systems. As a result, the present disclosure provides technologies for improving energy efficiency, while reducing the size and/or number of electrical components required for converting voltages provided by multiple power sources to an output voltage that is substantially equal to a desired output voltage.

In the following detailed description, references are made to the accompanying drawings that form a part hereof, and that show by way of illustration, specific embodiments or examples. Referring now to the drawings, in which like numerals represent like elements through the several figures, technologies for synchronizing multiple DC voltages provided by multiple power sources according to the various embodiments will be described.

FIG. 1 is a schematic diagram of a circuit including a reconfigurable DC interface, in accordance with some embodiments. In particular, FIG. 1 shows a reconfigurable DC interface 100 including a controller 102 and a plurality of DC-DC converter modules 110A-110N receiving multiple input voltages from multiple power sources 108A-108N. The power sources 108A-108N are generally referred to herein as power sources 108. The power sources 108 may be any type of power source that is configured to provide a DC input voltage. Examples of the power sources 108 include renewable power sources, such as wind turbines or photo voltaic panels, or any other power source capable of providing a DC voltage, such as a battery.

Each of the DC-DC converter modules 110A-110N, generally referred to herein as DC-DC converter module 110, is configured to receive the input voltage from a corresponding power source 108, convert the input voltage to an output voltage, and output the output voltage. Each of the DC-DC converter modules 110 may be identical or similar to one another such that each of the DC-DC converter modules 110 is capable of operating as a master DC-DC converter module or a slave DC-DC converter module. Details regarding operating as a master DC-DC converter module and a slave DC-DC converter module are described below.

The first DC-DC converter module 110A may include a first voltage input terminal 112A that is configured to receive a first input voltage from a first power source 108A that may be electrically coupled to the voltage input terminal 112A. The first DC-DC converter module 110A may also include a first control terminal 118A that is configured to receive one or more control signals from the controller 102. Details regarding control signals and the controller 102 are described below. The first DC-DC converter module 110A may include a digital processing circuit that may be configured to convert the first input voltage received from the first power source 108A to a first output voltage that is substantially equal to the desired output voltage. According to embodiments, the first DC-DC converter module 110A may do so based on the control signal being received at the control terminal 118A of the first DC-DC converter module 110A. The first output voltage is provided at a first voltage output terminal 114A. Further, the first DC-DC converter module 110A may also include a first reference terminal 116A that is electrically coupled to reference terminals 116B-116N associated with the remainder of the DC-DC converter modules 110B-110N.

Similarly, the remainder of the DC-DC converter modules 110B-110N may also include corresponding voltage input terminals 112B-112N, voltage output terminals, 114B-114N, control terminals 118B-118N, and reference terminals 116B-116N. Each of the remainder of the DC-DC modules 110B-110N may be configured to receive corresponding input voltages from respective power sources 108B-108N. Further, each of the DC-DC modules 110B-110N may include a digital signal processing circuit that is configured to convert the corresponding input voltage to an output voltage that is substantially equal to the desired output voltage.

According to embodiments, a first output voltage is substantially equal to the desired output voltage as long as the voltage level of the first output voltage is within a predefined range of voltage levels and the frequency of the output voltage is within a predefined range of voltage frequencies. The predefined range of voltage levels may vary within 10% of the desired output voltage level, for example. Similarly, the predefined range of frequencies may be within 10% of the frequency of the desired output voltage frequency. It should be appreciated that the predefined range may be less than or greater than 10% based on the application in which the reconfigurable DC interface 100 is being used. In other words, the first output voltage may be substantially equal to the desired output voltage as long as the first output voltage is capable of providing similar results without causing electrical instability or damage to electrical components.

The controller 102 may include a network interface 103 through which one or more devices 150A-150N, generally referred to herein as devices 150, are capable of communicating with the controller 102. According to some embodiments, the network interface 103 may be a separate component that is communicatively coupled to the controller 102 such that the controller 102 may communicate with remote devices, such as device 150N via the network interface 103. The devices 150 may be configured to send controller input signals to the controller 102. A controller input signal may include one or more instructions for requesting the reconfigurable DC interface 100 to provide a desired output voltage as an output voltage and/or designate a particular DC-DC converter module 110 as a master DC-DC converter module. According to some embodiments, some or all of the devices 150 may be local devices, such as the device 150A, which may communicate with the controller 102 directly. Alternatively, some or all of the devices 150, may be remote devices, such as the device 150N, which may communicate with the controller 102 via a network 160.

The controller 102 may be configured to receive controller input signals from the devices 150 and issue one or more control signals corresponding to the controller input signals to the DC-DC converter modules 110. According to embodiments, the control signals may include instructions to the DC-DC converter modules 110 to provide a desired output voltage. Additionally, the control signals may include instructions for designating one of the DC-DC converter modules 110A as a master DC-DC converter module and the remaining DC-DC converter modules 110B-110N as slave DC-DC converter modules. It should be appreciated that the desired output voltage includes a desired voltage level and a desired frequency. It should be appreciated that the desired voltage level and frequency may be based on the voltage and frequency of the one or more power sources and/or the load requirements to which the reconfigurable DC interface is providing the output voltage.

As described above, each of the DC-DC converter modules 110 are electrically coupled to one another via the reference terminals 116A-116N. According to some example embodiments, the controller 102 may send one or more control signals to each of the DC-DC converter modules 110. According to embodiments, the control signals may include one or more instructions to provide the desired output voltage at the respective voltage output terminals 114A-114N of the DC-DC converter modules 110. Further, the control signals may include one or more instructions designating a particular DC-DC converter module, such as DC-DC converter module 110A as a master DC-DC converter module. The control signals may further include one or more instructions designating the remaining DC-DC converter modules, such as the DC-DC converter modules 110B-110N as slave DC-DC converter modules.

As shown in FIG. 1, the first DC-DC converter module 110A is represented by a solid line indicating that the first DC-DC converter module 110A is operating as the master DC-DC converter module. The remaining DC-DC converter modules 110B-110N are represented by dashed lines indicating that the remaining DC-DC converter modules 110B-110N are operating as slave DC-DC converter modules. It should be appreciated that any of the DC-DC converter modules 110 may operate as the master DC-DC converter module, with the remaining DC-DC converter modules 110 operating as the slave DC-DC converter modules. The choice of selecting a particular DC-DC converter module 110 as the master DC-DC converter module may be determined by the controller 102 or by a device 150 communicatively coupled to the controller 102.

According to embodiments, the selection of the master DC-DC converter module from the DC-DC converter modules 110 is based on various factors, including but not limited to, the voltage level and frequency of the one or more power sources 108, the load requirements to which the reconfigurable DC interface 100 may provide the output voltage, the duration for which a power source providing a respective input voltage to the master DC-DC converter module can consistently provide the input voltage, environmental conditions, and the like.

During the operation of the reconfigurable DC interface 100, a device 150 or the controller 102 may determine that one of the slave DC-DC converter modules 110B-110N should operate as the master DC-DC converter module. This determination may be made based on the relative input voltages being supplied by the power sources 108 or changes in the voltage demand of an electrical load coupled to the reconfigurable DC interface 100. For instance, on a windy day, the first power source 108A, which may be a wind turbine may be designated as the master DC-DC converter module. However, as the day goes on, and the wind slows down, the first power source 108A provides a relatively lower input voltage level than earlier in the day. If the voltage demands of the electrical load do not change, a device 150 or the controller 102 may determine an alternate power source that is able to provide a relatively higher input voltage level than the voltage level being provided by the first power source. For instance, the alternate power source may be the second power source 108B, which may be a photovoltaic resource that can provide high voltages on a clear, sunny day. Accordingly, the device 150 or the controller 102 may designate the second DC-DC converter module 110B associated with the second power source 108B as the new master DC-DC converter module in order to better meet the voltage demands of the electrical load.

Each of the slave DC-DC converter modules may be candidates for operating as the master DC-DC converter module. It should be appreciated that a candidate slave DC-DC converter module 110B-110N may replace an existing master DC-DC converter 110A module as the new master DC-DC converter module at any point in time. This is possible by sending one or more new control signals to the DC-DC converter modules 110 that include instructions to designate the candidate slave DC-DC converter module as the new master DC-DC converter module.

Once the master DC-DC converter module 110A generates the desired output voltage, the reference terminal 116A of the master DC-DC converter module 110A is configured to provide a reference signal corresponding to the generated desired output voltage to the reference terminals 116B-116N of the slave DC-DC converter modules 110B-110N. Each of the slave DC-DC converter modules 110B-110N may receive the reference signal at the respective reference terminal 116B-116N. The slave DC-DC converter modules 110B-110N may utilize the reference signal, which includes the desired output voltage generated by the master DC-DC converter module 110A to convert the input voltage received from their respective power source 108B-108N into the desired output voltage such that the output voltages of the slave DC-DC converter modules 110B-110N are synchronized with the generated output voltage of the master DC-DC converter module 110A.

The reconfigurable DC interface 100 may also include an energy storage DC-DC converter module 140. The energy storage DC-DC converter module 140 may have components similar to those of the DC-DC converter modules 110. According to embodiments, the energy storage DC-DC converter module 140 may include a voltage input terminal 142 that may be coupled to a power source 138 configured to provide an energy storage input voltage. The energy storage DC-DC converter module 140 may be configured to receive the energy storage input voltage, convert the energy storage input voltage to an energy storage output voltage, and provide the energy storage output voltage to an energy storage component coupled to a voltage output terminal 144 of the energy storage DC-DC converter module 140.

According to various embodiments, the energy storage DC-DC converter module 140 may also include a control terminal 148 electrically coupled to the controller 102 and a reference terminal 146 that may or may not be electrically coupled to the reference terminals of the DC-DC converter modules 110. The controller 102 may be configured to issue storage control signals via the control terminal 148 of the energy storage DC-DC converter 140. The storage control signals may include instructions for configuring the energy storage DC-DC converter 140 to convert the energy storage input voltage to a desired energy storage output voltage.

According to various embodiments, the reconfigurable DC interface 100 may be a physical rack where each of the DC-DC converter modules 110 can be located in-place and share a common controller and network interface. The controller 102 may enable each of the DC-DC converter modules 110 to be remotely programmable. Additionally, the controller 102 may be configured to monitor the input voltages and input currents being provided to each of the DC-DC converter modules 110 and configure the DC-DC converter modules 110 to convert the input voltages to a desired output voltage. It should be appreciated that hardware components not shown in FIG. 1, such as sensors, ammeters, voltmeters, and other circuit sensing components may monitor the input voltages and input currents being provided to each of the DC-DC converter modules 110.

Figure 2:
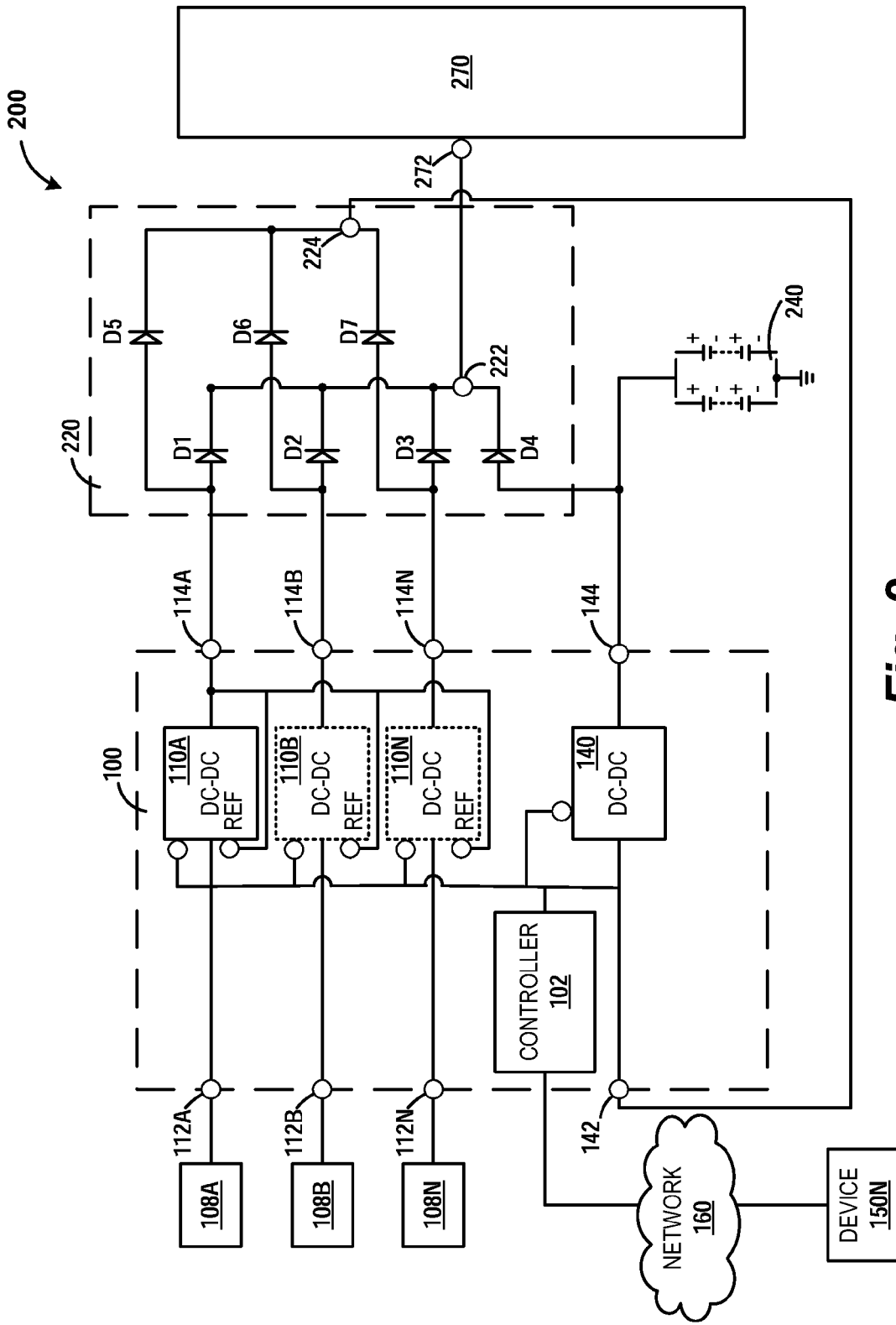
FIG. 2 is a schematic diagram of a circuit application 200 implementing the reconfigurable DC interface 100 shown in FIG. 1, in accordance with some embodiments.

FIG. 2 is a schematic diagram of a circuit application 200 implementing the reconfigurable DC interface 100 shown in FIG. 1. According to embodiments, the power sources 108 may be renewable power sources, such as wind turbines and photo voltaic resources, or any other type of power source, such as batteries. The various power sources may provide DC input voltages to the reconfigurable DC interface 100 at different voltage levels. The reconfigurable DC interface 100 converts the input voltages to produce synchronized output voltages having substantially equal voltage levels and frequencies. The synchronized output voltages may be combined into a combined output voltage by coupling the output terminals 114 of the DC-DC converter modules 110.

According to embodiments, a first power source 108A may be a wind turbine that provides a first input voltage to the voltage input terminal 112A of a first DC-DC converter module 110A. A second power source 108B may be a first photovoltaic resource that provides a second input voltage to the voltage input terminal 112B of a second DC-DC converter module 110B. A third power source 108N may be a second photovoltaic resource that provides a third input voltage to the voltage input terminal 112N of a third DC-DC converter module 110N. Each of the three DC-DC converter modules 110A, 110B, 110N may be configured to convert a respective input voltage to a respective output voltage that is substantially equal to the desired output voltage. As described above, the master DC-DC converter module 110A may utilize the control signal indicating the desired output voltage to convert a master input voltage to a master output voltage that is substantially equal to the desired output voltage. The slave DC-DC converter modules 110B-110N may utilize the reference signal issued by the master DC-DC converter module 110A to convert a corresponding input voltage to a corresponding slave output voltage that is substantially equal to the master output voltage. The master output voltage and the slave output voltages are output at the respective voltage output terminals 114.

As described above with respect to FIG. 1, the reconfigurable DC interface 100 also includes the energy storage DC-DC converter module 140. The energy storage DC-DC converter module 140 may be configured to receive an energy storage input voltage at the energy storage input terminal 142 and convert the energy storage input voltage to an energy storage output voltage, which is output at the energy storage output terminal 144 of the energy storage DC-DC converter module 140. An energy storage component 240, such as a configurable battery capable of supplying varying amounts of power at varying voltages may be coupled to the energy storage output terminal 144. The energy storage DC-DC converter module 140 may also receive an energy storage control signal from the controller 102 that may provide instructions for converting the energy storage input voltage to a desired energy storage output voltage. The desired energy storage output voltage may be selected to match the energy storage discharge voltage of the energy storage component 240.

The circuit application 200 may further include a switching circuitry 220 configured to selectively provide the output voltages of the DC-DC converter modules to an electrical load 270 or an energy storage component 240. Examples of the electrical load 270 may include an inverter, a voltage bus, and the like. Examples of the energy storage component 240 may include a configurable battery for storing energy generated by the renewable power sources and providing an energy storage discharge voltage at varying voltage levels and frequencies. According to embodiments, the electrical load 270 may receive a load voltage from either the output terminals 114 of the DC-DC converter modules 110, the energy storage component 240, or a combination of the two. In some embodiments, the energy storage component 240 may provide the load voltage to the electrical load 270 as long as the energy storage component 240 has enough stored capacity to provide the load voltage required by the electrical load 270. While the energy storage component 240 is providing the load voltage, the switching circuitry 220 provides the output voltages of the DC-DC converter modules 110 to the energy storage DC-DC converter module 140 for charging the energy storage component 240. Once the energy storage component 240 can no longer provide the desired load voltage, the switching circuitry 220 causes the output voltages of the DC-DC converter modules 110 to be provided to the electrical load 270. According to embodiments, the switching circuitry 220 may be configured to combine the output voltages of the DC-DC converter modules 110 to provide a combined output voltage to the input voltage terminal 272 of the electrical load 270.

According to embodiments, the switching circuitry 220 may include input terminals that are coupled to the voltage output terminals 114 of the DC-DC converter modules 110 and the energy storage output terminal 144 of the energy storage DC-DC converter module 140. In some embodiments, the switching circuitry 220 may further include a load voltage supply output terminal 222 that is coupled to the input voltage terminal 272 of the electrical load 270 such that the switching circuitry 220 is capable of providing the load voltage to the electrical load 270. In addition, the switching circuitry 220 may also include an energy storage voltage supply output terminal 224 that is coupled to the energy storage input terminal 142 such that an energy storage voltage can be provided to the energy storage DC-DC converter module 140. According to various embodiments, the load voltage may be the voltage that the electrical load requires to operate. The energy storage voltage may be the voltage that is provided to the energy storage DC-DC converter module 140. Typically, the energy storage voltage is substantially equal to the output voltages of the DC-DC converter modules 110.

According to some embodiments, the switching circuitry 220 may include seven diodes D1-D7, each of which includes an anode terminal and a cathode terminal. An anode terminal of a first diode D1 is coupled to the voltage output terminal 114A of the first DC-DC converter module 110A, an anode terminal of a second diode D2 is coupled to the voltage output terminal 114B of the second DC-DC converter module 110B, and an anode terminal of a third diode D3 is coupled to the voltage output terminal 114N of the third DC-DC converter module 110N. The cathode terminals of each of the diodes D1, D2, D3 are coupled to one another at the load voltage supply output terminal 222. In this way, the output voltages of the DC-DC converter modules 110 may be combined to form a combined output voltage that may be provided to the electrical load 270 as the load voltage. The anode terminal of the fourth diode D4 may be coupled to the voltage output terminal 144 of the energy storage DC-DC converter module 140.

The anode terminals of diodes D5, D6, D7 may also be coupled to the respective voltage output terminals 114 of the DC-DC converter modules 110 respectively. The cathode terminals of the diodes D5, D6, D7 may be coupled to one another at the energy storage voltage output terminal 224, which may be coupled to the energy storage voltage input terminal 142 of the energy storage DC-DC converter module 140.

According to embodiments, the switching circuitry 220 is configured to selectively provide a load voltage to the electrical load 270 through the load voltage supply output terminal 222 or provide an energy storage voltage to the energy storage DC-DC converter module 140 through the energy storage voltage output terminal 224. According to some embodiments, the source of the load voltage may be the DC-DC converter modules 110, the energy storage component 240, or a combination of the DC-DC converter modules 110 and the energy storage component 240.

As described above, the output voltages of the DC-DC converter modules 110 may either pass through the diodes D1, D2, D3 or alternatively, through the diodes D5, D6, D7. According to embodiments, the energy storage component 240 is also coupled to the voltage output terminal 144. Therefore, in some embodiments, when the energy storage component 240 is discharging, the energy storage component 240 provides an energy storage discharge voltage, which passes through the fourth diode D4 and provides the energy storage discharge voltage to the electrical load 270.

The switching circuitry 220 may selectively provide a storage voltage to the voltage input terminal 142 of the energy storage DC-DC converter module 140. The switching circuitry 200 may be configured in such a way that the energy storage discharge voltage of the energy storage component 240 and/or the combined output voltage of the DC-DC converter modules 110 are capable of being supplied to the electrical load 270. If the difference between the voltage level of the energy storage discharge voltage and the voltage level of the combined output voltages of the DC-DC converters 110 is greater than the voltage drop across the diode D4, the energy storage component 240 provides the energy storage discharge voltage to the electrical load 270. In such circumstances, the combined output voltage, which is the combination of the output voltages of the DC-DC converter modules 110, may be provided to the energy storage voltage input terminal 142 of the energy storage DC-DC converter module 140 via the energy storage voltage output terminal 224. It should be appreciated that the combined output voltage may be much lower during certain environmental conditions. The configurable energy storage component 240 however, may have enough stored capacity to provide a steady discharge voltage substantially equal to the desired output voltage even when the DC-DC converter modules 110 are unable to do so. In this way, the configurable energy storage component 240 may also serve as a DC voltage source.

According to embodiments, the combined output voltage may be greater than the energy storage discharge voltage of the energy storage component 240. If the difference between the combined output voltage and the energy storage discharge voltage is greater than the voltage drop across the diodes D1-D4, the combined output voltage may be provided to the electrical load 270.

It should be appreciated that other switching circuitries may be used or implemented. The diodes D1-D7 may be replaced by other electrical components, such as transistors, switches, and the like. Further, any switching circuitry that is capable of switching between providing the combined output voltage to the electrical load 270 and providing the combined output voltage to the energy storage component 240 may be utilized. Also, in some embodiments, some or all of the combined output voltage and some or all of the energy storage discharge voltage may be provided to the electrical load 270 simultaneously, with the remainder of the combined output voltage being provided to the energy storage input terminal 142 of the energy storage DC-DC converter module 140.

The reconfigurable DC interface 100 may serve as an interface that allows multiple power sources 108 providing differing voltages to operate as a constant voltage source. Utilizing the reconfigurable DC interface 100 in a microgrid environment, such as the circuit application 200, provides for a more efficient power generation and distribution system. This is because the voltages provided by the renewable energy sources, such as the photovoltaic resources and wind turbine resources can swing well below the desired output voltage as required by the electrical load 270. In situations where the power sources 108 cannot provide enough power to produce the desired output voltage, energy can be harvested at the electrical load 270 or the energy storage component 240. By way of the synchronized DC-DC converter modules 110, the use of bulk resistors and power diodes are reduced, if not eliminated. As a result, power losses caused by bulk resistors and power diodes due to varying voltage levels of the input voltages provided by the power sources 108 are also reduced, making a circuit application including the reconfigurable DC interface 100 more efficient than a circuit application without the reconfigurable DC interface 100.

Through the utilization of the reconfigurable DC interface 100, circuit applications, such as microgrids, may provide a user more control over power generation and loading. Also, the user may be able to program the circuit application, via the controller 102, to control the amount of power available to the electrical load 270 or the energy storage component 240, and the charging and discharging of the energy storage component 240. This may result in an improved power generation and loading system.

Figure 3:
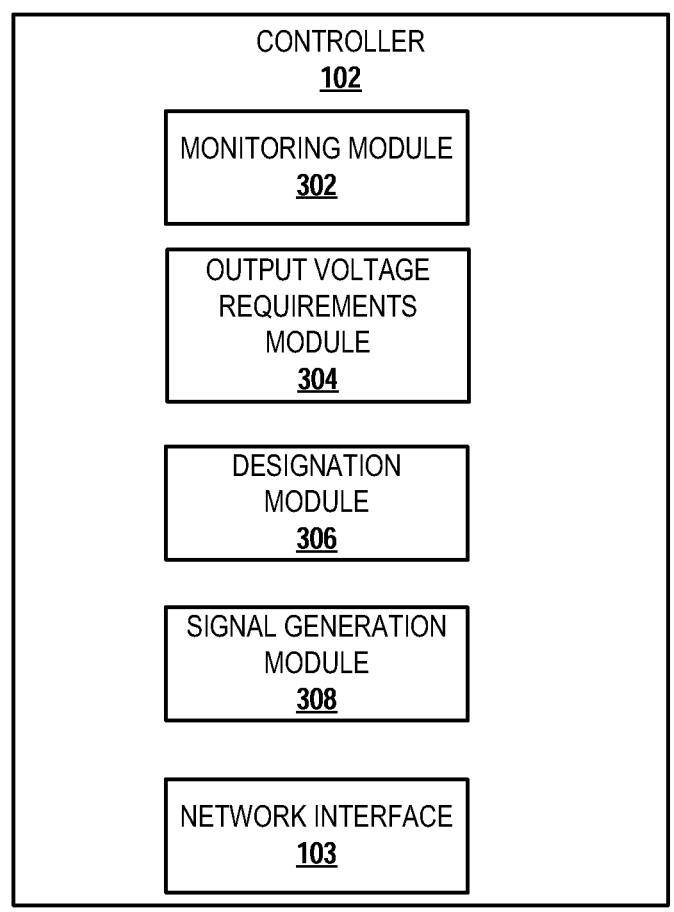
FIG. 3 is a block diagram illustrating components of a controller of the reconfigurable DC interface, in accordance with some embodiments.

Referring now to FIG. 3, a block diagram illustrating components of the controller 102 of the reconfigurable DC interface 100 is shown. According to embodiments, the controller 102 may include the network interface 103. Further, the controller 102 may include a monitoring module 302, an output voltage requirements module 304, a designation module 306, and a signal generation module 308.

The monitoring module 302 may be configured to monitor the master input voltage associated with the master DC-DC converter module 110A and the slave input voltage associated with each of the slave DC-DC converter modules 110B-110N. As described above, the monitoring module 302 may communicate with sensors that may determine the environmental conditions at the site of a power source as well as with sensors or instruments that may measure the voltage and power being supplied by the power sources.

The controller 102 may also include the output voltage requirements module 304, which may be configured to determine the desired output voltage to be generated by the DC-DC converter modules from the input voltages received by the DC-DC converter modules. According to embodiments, the output voltage requirements module 304 may determine the desired output voltage by determining the requirements of the electrical load coupled to the reconfigurable DC interface

100. As described above, the switching circuitry 220 may operate as a switch for the reconfigurable DC interface 100, such that when the switching circuitry 220 is activated, the output voltages of the reconfigurable DC interface 100 may be combined and provided to the electrical load 270 via the load voltage supply output terminal 222. When the switching circuitry 220 is deactivated, the output voltages of the reconfigurable DC interface 100 may be combined and provided to the energy storage input terminal 142 via the energy storage voltage output terminal 224. It should be appreciated that the output voltage requirements module 304 may be configured to receive a controller input signal from a device 150 indicating the desired output voltage to which to convert the differing input voltages being received by the DC-DC converter modules 110.

The controller 102 may further include the designation module 306, which is configured to designate one of the DC-DC converter modules 110 as a master DC-DC converter module. Further, the designation module 306 may designate each of the remaining DC-DC converter modules as a slave DC-DC converter module. The designation module 306 may utilize information provided by the monitoring module 302 and the output voltage requirements module 304 to determine which DC-DC converter module to designate as the master DC-DC converter module. Typically, a DC-DC converter module coupled to a power source that is capable of providing a constant dc input voltage is designated as the master DC-DC converter module. In addition, other factors that are considered in determining which dc-dc converter module to designate as the master DC-DC converter module include the desired output voltage and the monitored input voltages. It should be appreciated that any of the DC-DC converter modules may be selected as the master DC-DC converter module.

The controller 102 may also include the signal generation module 308, which may be configured to generate one or more control signals that include instructions for indicating a desired output voltage, designating one of the DC-DC converter modules as a master DC-DC converter module, and designating each of the remaining DC-DC converter modules as a slave DC-DC converter module. In particular, the signal generation module 308 may generate a voltage control signal that is configured to indicate the desired output voltage to the DC-DC converter modules. According to some embodiments, the voltage control signal may only be issued to the master DC-DC converter module. The signal generation module 308 may also include a designation control signal that designates one of the DC-DC converter modules as the master DC-DC converter module and the remaining DC-DC converter modules as the slave dc-dc converter module.

Figure 4:
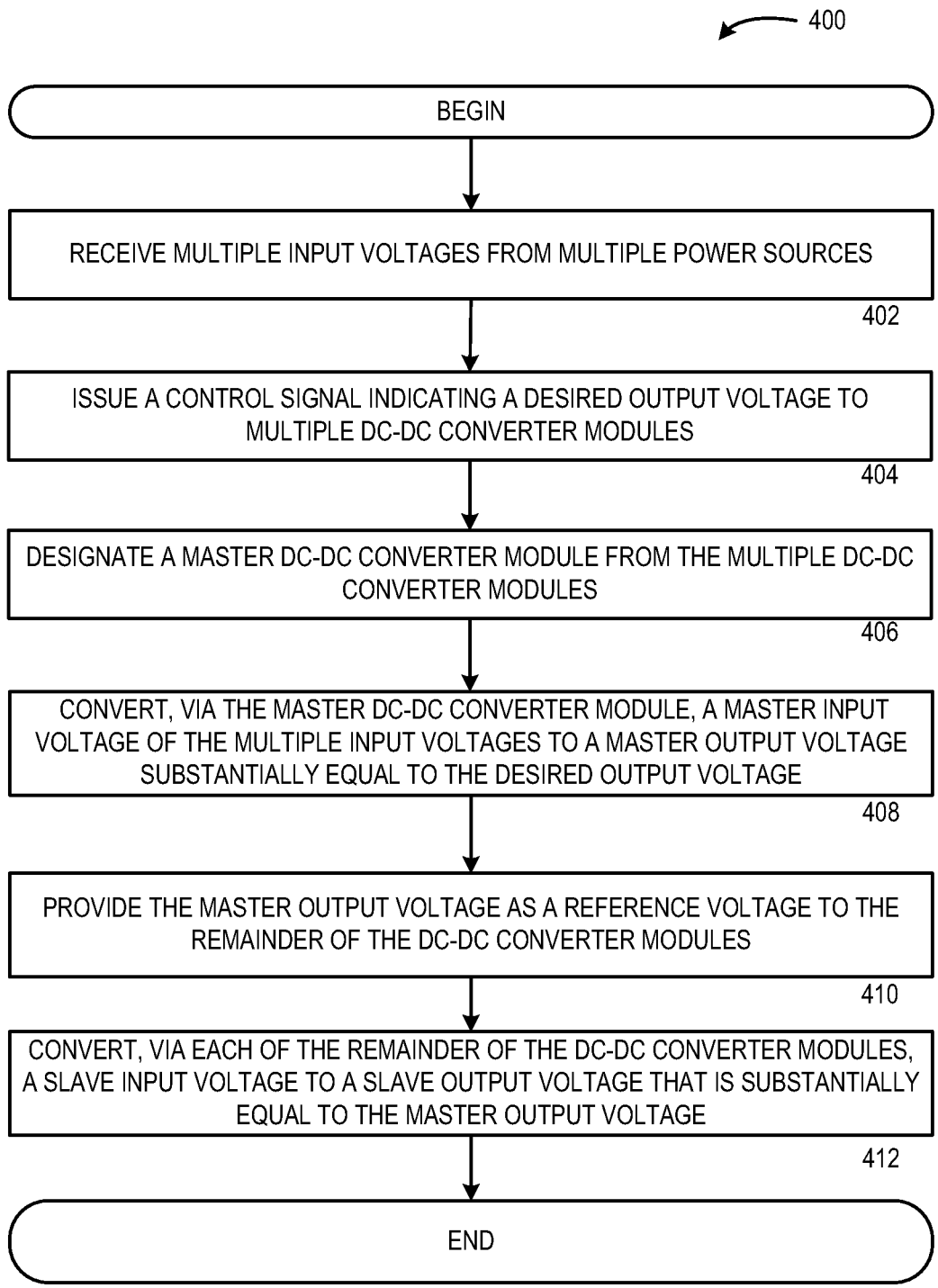
FIG. 4 is a flow diagram illustrating a process of synchronizing multiple voltages supplied from multiple power sources, in accordance with some embodiments.

FIG. 4 is a flow diagram illustrating an example routine 300 provided herein for synchronizing the voltage of one or more power sources 108 having different voltages, in accordance with some embodiments. It should be appreciated that the logical operations described herein may be performed by specifically programmed computing devices and/or analog or digital circuitry depending on the implementation. It should be appreciated that more or fewer operations may be performed than shown in the figures and described herein. These operations may also be performed in a different order than those described herein.

Referring now to FIG. 4, the routine 400 begins at operation 402, where the reconfigurable DC interface 100 receives multiple input voltages from multiple power sources 108. According to embodiments, each DC-DC converter module in the reconfigurable DC interface 100, such as DC-DC converter module 110A, may receive an input voltage from a respective power source, such as power source 108A. A power source 108 may only provide an input voltage to one DC-DC converter module 110 and no DC-DC converter module may receive multiple input voltages from multiple power sources. The input voltages may be received at the voltage input terminals 112 of the corresponding DC-DC converter modules 110.

From operation 402, the routine 400 proceeds to operation 404, where the controller 102 issues a control signal that indicates a desired output voltage to the DC-DC converter modules 110. The controller 102 may receive a controller input signal from one or more of the devices 150, which causes the controller 102 to issue a control signal corresponding to the controller input signal. In some embodiments, the controller 102 may be capable of determining a desired output voltage, determining a candidate DC-DC converter module to designate as the master DC-DC converter module, and issuing a control signal without receiving the controller input signal. The control signal issued by the controller 102 may be sent to each of the DC-DC converter modules 110. In some embodiments, the control signal may be sent only to the candidate DC-DC converter module that is designated to be the master DC-DC converter module.

From operation 404, the routine 400 proceeds to operation 406, where the controller 102 designates one of the DC-DC converter module 110A as a master DC-DC converter module. The selection of a particular DC-DC converter module as the master DC-DC converter module may be made based on the desired output voltage, the input voltage being provided by the corresponding power source, the environmental conditions that may influence the input voltage being provided by the power source. In various embodiments, the control signal includes instructions that designate the candidate DC-DC converter module 110A as the master DC-DC converter module 110A. Further, in some embodiments, the control signal may also include instructions that designate the remaining DC-DC converter modules 110B-110N as slave DC-DC converter modules.

The routine 400 proceeds from operation 406 to operation 408, where the master DC-DC converter module 110A converts a master input voltage to a master output voltage that is substantially equal to the desired output voltage. The master input voltage is the input voltage of the candidate DC-DC converter module 110A that is designated as the master DC-DC converter module. The master DC-DC converter module 110A may include a digital signal processing circuit that is configured to convert the master input voltage to the master output voltage.

From operation 408, the routine 400 proceeds to operation 410, where the master DC-DC converter module 110A is configured to provide the master output voltage to the remainder of the DC-DC converter modules 110B-110N as a reference voltage. According to embodiments, the master DC-DC converter module 110A may provide the master output voltage or a reference signal corresponding to the master output voltage to the reference terminals 116B-116N of the slave DC-DC converter modules 110B-110N. It should be appreciated that the reference terminal 116A of the master DC-DC converter module 110A may output a reference signal, while the reference terminals 116B-116N of the slave DC-DC converter modules 110B-110N may receive the reference signal from the reference terminal 116A of the master DC-DC converter module 110A.

From operation 410, the routine 400 proceeds to operation 412, where each of the slave DC-DC converter modules 110B-110N converts a corresponding slave input voltage to a slave output voltage that is substantially equal to the master output voltage. In this way, each of the input voltages supplied by the multiple power sources 108 is converted to a corresponding output voltage that is substantially equal to the desired output voltage. As a result, the reconfigurable DC interface 100 has converted input voltages of varying voltage levels and frequencies into output voltages that have substantially equal voltage levels and frequencies. From operation 412, the routine 400 ends.

It should be appreciated that the reconfigurable DC interface 100 may not utilize each and every DC-DC converter module 110 that is a part of the reconfigurable DC interface 100, but rather, only utilize those DC-DC converter modules that are electrically coupled to a power source providing an input voltage. In some embodiments, the controller 102 may only send control signals to the DC-DC converter modules that are receiving input voltages. In some embodiments, each of the DC-DC converter modules 110 may have a unique network address, which may allow the controller 102 to issue control signals to particular DC-DC converter modules. In some embodiments, the controller 102 may assign each of the DC-DC converter modules 110 a unique network address.

Figure 5:
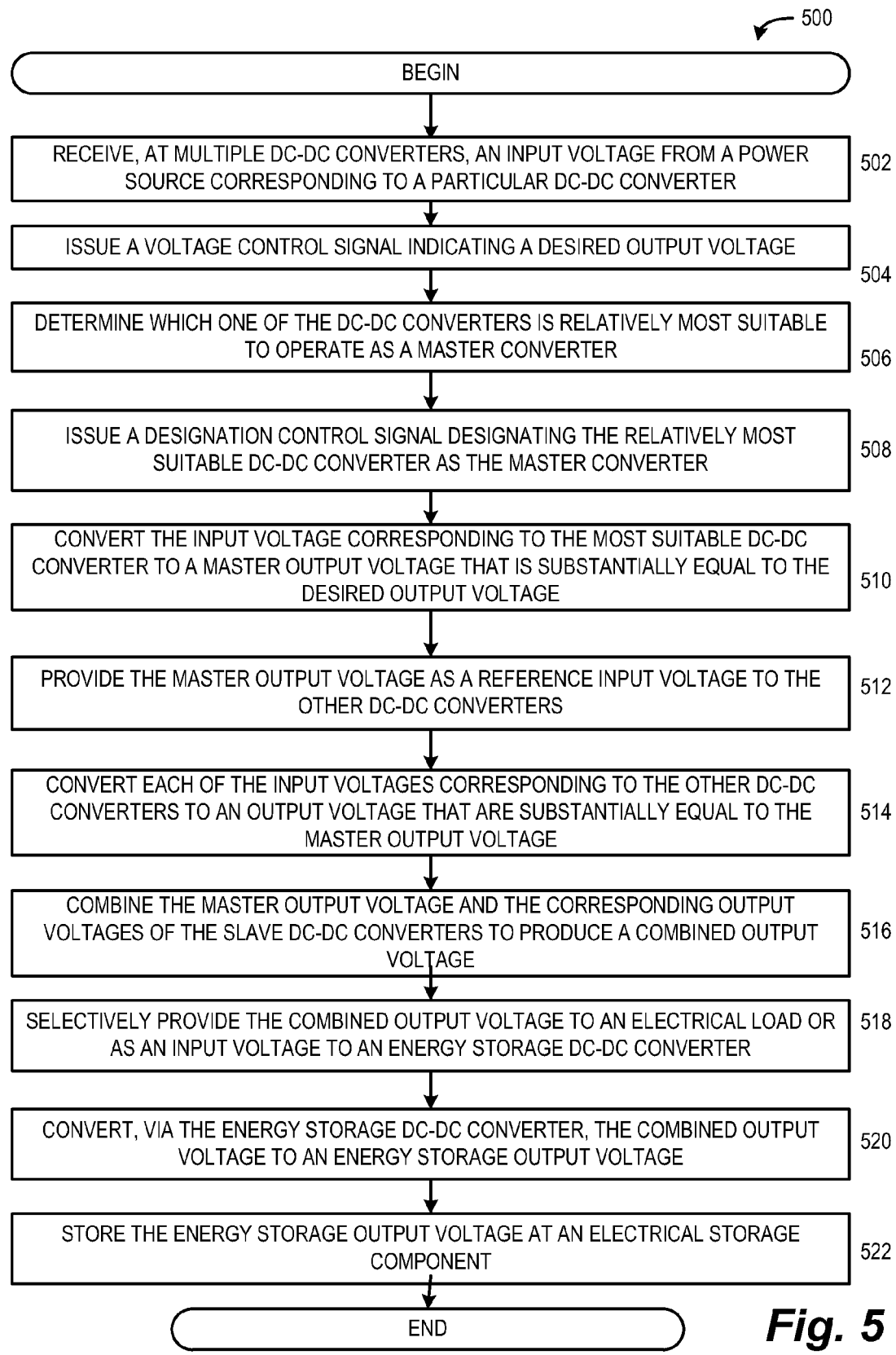
FIG. 5 is a flow diagram illustrating a process of providing a DC output voltage to an electrical load from multiple voltages supplied by multiple power sources, in accordance with some embodiments.

FIG. 5 is a flow diagram illustrating a process of providing a DC output voltage to an electrical load from multiple voltages supplied by multiple power sources, in accordance with some embodiments. A routine 500 begins at operation 502, where multiple DC-DC converter modules 110 receive multiple input voltages from multiple power sources 108. According to embodiments, each power source 108 provides a corresponding input voltage to a corresponding DC-DC converter module 110. According to embodiments, the power source 108A may provide a first input voltage to the DC-DC converter module 110A, and the power source 108B may provide a second input voltage to the DC-DC converter module 110B. Similarly, additional power sources 108 may provide input voltages to corresponding DC-DC converter modules 110 of the reconfigurable DC interface 100. Examples of the power sources 108 may be wind turbines, photo voltaic panels, or any other source of voltage.

From operation 502, the routine 500 proceeds to operation 504, where the controller 102 issues a voltage control signal to the DC-DC converter modules 110. The voltage control signal includes one or more instructions indicating a desired output voltage to which the input voltages are to be converted. The desired output voltage may include a specific voltage level and frequency. According to embodiments, the controller 102 may determine the desired output voltage based on current load requirements. Alternatively, a device 150 may provide a controller input signal to the controller 102 indicating the desired output voltage. The controller 102 may issue the voltage control signal to each of the DC-DC converter modules 110 receiving an input voltage or to all of the DC-DC converter modules, including those DC-DC converter modules that are not currently receiving input voltages. In addition, the controller 102 may issue the voltage control signal to the energy storage DC-DC converter 140.

From operation 504, the routine 500 proceeds to operation 506, where the controller 102 may determine which one of the DC-DC converter modules 110 is most suitable to operate as a master DC-DC converter module. According to various embodiments, the determination may be made by any of the devices 150 that may be communicatively coupled to the controller 102. In various embodiments, the determination may be made based on the relative performance of the power sources 108 providing input voltages to the DC-DC converter modules 110.

According to embodiments, the DC-DC converter module 110A receiving an input voltage from a power source 108A that is capable of providing a relatively constant input voltage for an extended period of time may be considered to be a suitable master DC-DC converter module. To determine if a power source 108 is capable of providing a relatively constant input voltage for an extended period of time, the controller 102 or other entity making the determination may consider various factors. For instance, if the power source is a wind turbine, some of the factors to be considered are current wind speed, historical wind speed, forecasted wind speed, and the like. For photovoltaic panels, some of the factors to be considered may be time of day, the presence of clouds, the short term weather forecast, the angle of the photovoltaic panels relative to the sun, historical weather conditions, and the like.

The entity making the determination, such as the device 150 or the controller 102, may utilize sensors that continuously monitor the current input voltages provided by each of the power sources 108 as well as the environmental conditions at the power generation components of the power sources 108. The entity making the determination may then compare the factors affecting power generation for each of the power sources 108, and based on that the comparison, determine which power source is relatively more capable of providing a constant input voltage for an extended period of time. Other factors to consider may be the amount of power and voltage that each of the power sources may provide.

From operation 506, the routine 500 proceeds to operation 508, where the controller 102 issues a designation control signal including one or more instructions that designates the most suitable DC-DC converter module 110A as the master DC-DC converter module. The controller 102 may issue the designation control signal to each of the DC-DC converter modules 110, but only the DC-DC converter module designated as the master DC-DC converter module may be able to operate as the master DC-DC converter module. According to some embodiments, the designation control signal and the voltage control signal may be issued separately or may be included within a control signal that includes instructions for designating the master DC-DC converter module 110A and indicating the desired output voltage. Additionally, the controller 102 may also designate the remainder of the DC-DC converter modules 110B-110N to operate as slave DC-DC converter modules by issuing one or more control signals. In some embodiments, the remainder of the DC-DC converter modules 110B-110N may automatically operate as slave DC-DC converter modules without receiving one or more control signals.

From operation 508, the routine 500 proceeds to operation 510, where the master DC-DC converter module 110A converts the input voltage from the corresponding power source 108A to a master output voltage that is substantially equal to the desired output voltage. According to embodiments, the master DC-DC converter 110A utilizes the voltage control signal to convert the input voltage to the master output voltage.

From operation 510, the routine 500 proceeds to operation 512, where the master DC-DC converter module 110A provides the master output voltage as a reference input voltage to one or more of the remaining DC-DC converter modules 110B-110N, which for the sake of clarity may be referred to herein as slave DC-DC converters. The master DC-DC converter module 110A may provide a reference signal from the reference terminal 116A that corresponds to the master output voltage. In some embodiments, the reference signal may include the master output voltage.

From operation 512, the routine 500 proceeds to operation 514, where each of the slave DC-DC converter modules 110B-110N converts a corresponding input voltage of a respective power source 108B-108N to an output voltage that is substantially equal to the master output voltage. According to embodiments, each of the slave DC-DC converter modules 110B-110N may receive the reference signal from the master DC-DC converter module 110A at the corresponding reference terminal 116 of the slave DC-DC converter module, such as the DC-DC converter module 110B. The slave DC-DC converter module 110B utilizes the reference signal to convert the corresponding input voltage to an output voltage that is substantially equal to the master output voltage. Since the master output voltage is substantially equal to the desired output voltage, it should be appreciated that the output voltages produced by the slave DC-DC converter modules 110B-110N may also be substantially equal to the desired output voltage. In this way, each of the output voltages is synchronized with the other output voltages, such that all the output voltages produced by the DC-DC converter modules are synchronized.

From operation 514, the routine 500 proceeds to operation 516, where the reconfigurable DC interface 100 combines the master output voltage and the output voltages of each of the slave DC-DC converter modules to produce a combined output voltage that is substantially equal to the desired output voltage. From operation 516, the routine 500 proceeds to operation 518, where a switching circuitry 220 electrically coupled to the reconfigurable DC interface 100 selectively provides the combined output voltage to either an electrical load 270 coupled to the reconfigurable DC interface 100 or an energy storage DC-DC converter module 140 coupled to the reconfigurable DC interface 100.

According to embodiments, the energy storage DC-DC converter module 140 is a part of the reconfigurable DC interface 100. Further, the energy storage DC-DC converter module 140 is configured to receive the combined output voltage as an electrical storage input voltage, and convert the electrical storage input voltage to an electrical storage output voltage that is stored in the electrical storage component 240. In some embodiments, the switching circuitry 220 may provide the combined output voltage to the energy storage DC-DC converter module 140 when the energy storage component 240 is providing an electrical storage discharge voltage to the electrical load 270. It should be appreciated that the energy storage component 240, which already has stored energy, may operate as a more stable voltage source than the multiple power sources 108 coupled to the reconfigurable DC interface 100.

From operation 518, the routine 500 proceeds to operation 520, where the energy storage DC-DC converter module 140 converts the combined output voltage received as an energy storage input voltage to the energy storage output voltage. The energy storage output voltage may be substantially equal to the desired output voltage. In some embodiments, the controller 102 may issue an energy storage voltage control signal indicating a different desired output voltage. The energy storage DC-DC converter module 140 may convert the energy storage input voltage to the desired output voltage desired by the controller 102. In various embodiments, the desired output voltage may be based on the voltage requirements of the energy storage component 240.

From operation 520, the routine 500 proceeds to operation 522, where the energy storage component 240 receives and stores the energy storage output voltage. According to embodiments, the energy storage component 240 may be a bidirectional battery that may be configured to store energy and discharge energy at varying input voltages. From operation 522, the routine 500 ends.

It should be appreciated that various elements, such as resistors, capacitors, inductors, and transistors are not shown for the sake of simplicity. It should also be appreciated by those skilled in the art that such elements may be included according to design requirements.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

What is claimed is:

1. A method for synchronizing voltages from multiple power sources, comprising:
receiving multiple direct current ("DC") input voltages from the multiple power sources;
receiving a controller input signal at a controller from a device to provide a desired output voltage;
issuing a voltage control signal indicating the desired output voltage to multiple DC-DC converter modules;
generating, via a master DC-DC converter module of the multiple DC-DC converter modules, a master output voltage that is substantially equal to the desired output voltage;
providing the master output voltage from the master DC-DC converter module to a remainder of the DC-DC converter modules; and
converting, at each of the remainder of the DC-DC converter modules, a slave input voltage of the multiple input voltages to a slave output voltage that is substantially equal to the master output voltage.

2. The method of claim 1, further comprises:
determining which of the multiple input voltages is suitable to be a first candidate input voltage;
identifying a first candidate DC-DC converter module from the multiple DC-DC converter modules that is configured to receive the first candidate input voltage;
designating the first candidate DC-DC converter module as the master DC-DC converter module; and
designating each of a remainder of the multiple DC-DC converter modules as a slave DC-DC converter module.

3. The method of claim 2, further comprising:
determining a second candidate input voltage from a remainder of the multiple input voltages,;
identifying, from the remainder of multiple DC-DC converter modules, a second candidate DC-DC converter module that is configured to receive the second candidate input voltage; and
designating the second candidate DC-DC converter module as the master DC-DC converter module and designating the first candidate DC-DC converter module as the slave DC-DC converter module.

4. The method of claim 1, further comprising issuing, to multiple DC-DC converter modules, a designation control signal including an instruction designating a candidate DC-DC converter module as the master DC-DC converter module.

5. The method of claim 4, wherein issuing a voltage control signal indicating a desired output voltage to multiple DC-DC converter modules comprises:
receiving the controller input signal at the controller wherein the controller input signal includes one or more instructions indicating the desired output voltage, and
generating the voltage control signal corresponding to the controller input signal; and
wherein issuing, to multiple DC-DC converter modules, a designation control signal including one or more instructions designating a candidate DC-DC converter module as the master DC-DC converter module comprises:
receiving the controller input signal at the controller, the controller input signal including one or more instructions designating a candidate DC-DC converter module as the master DC-DC converter module, and
generating the designation control signal corresponding to the controller input signal.

6. The method of claim 1, further comprising:
combining the master output voltage and the slave output voltage of each of the remainder of the DC-DC converter modules to produce a combined output voltage; and
providing the combined output voltage to an electrical component.

7. The method of claim 1, further comprising:
receiving an energy storage input voltage at an energy storage DC-DC converter module;
converting, via the energy storage DC-DC converter module, the energy storage input voltage to an energy storage output voltage; and
providing the energy storage output voltage to an energy storage component.

8. The method of claim 7, further comprising:
combining the master output voltage and the slave output voltage of each of the remainder of the DC-DC converter modules to generate a combined output voltage; and
providing the combined output voltage to the energy storage DC-DC converter module as the energy storage input voltage.

9. A reconfigurable DC interface, comprising:
a controller configured to receive a controller input signal indicating a desired output voltage from a device and provide a control signal to a plurality of DC-DC converter modules, the control signal including one or more instructions for indicating the desired output voltage, designating a first DC-DC converter module of the plurality of DC-DC converter modules as a master DC-DC converter module, and designating a second DC-DC converter module of the plurality of DC-DC converter modules as a slave DC-DC converter module;
the master DC-DC converter module configured to
receive a master input voltage from a first power source of a plurality of power sources,
convert the master input voltage to a master output voltage that is substantially equal to the desired output voltage, and
provide the master output voltage to the remainder of the DC-DC converter modules; and
the slave DC-DC converter module configured to
receive a slave input voltage from a respective power source of a remainder of the plurality of power sources,
receive the master output voltage from the master DC-DC converter module, and
convert the slave input voltage to a slave output voltage that is substantially equal to the master output voltage.

10. The reconfigurable DC interface of claim 9, further comprising an output voltage terminal configured to
combine the slave output voltage and the master output voltage to produce a combined output voltage; and
provide the combined output voltage to an electrical component.

11. The reconfigurable DC interface of claim 9, further comprising an energy storage DC-DC converter module configured to receive an energy storage input voltage from an energy storage power source; and
convert the energy storage input voltage to an energy storage output voltage.

12. The reconfigurable DC interface of claim 11, wherein the energy storage DC-DC converter module comprises:
an energy storage voltage input terminal configured to receive the energy storage input voltage from the energy storage power source; and
an energy storage digital processing circuitry configured to convert the energy storage input voltage to the energy storage output voltage; and
an energy storage voltage output terminal configured to provide the energy storage output voltage to an energy storage component.

13. The reconfigurable DC interface of claim 9, further comprising a network interface configured to provide network access to the controller.

14. The reconfigurable DC interface of claim 9, wherein the controller comprises:
a monitoring module configured to monitor the master input voltage and the slave input voltage associated with each of the slave DC-DC converter modules;
an output voltage requirements module configured to determine the desired output voltage;
a designation module configured to designate a DC-DC converter module from the plurality of DC-DC converter modules as a master DC-DC converter module and each of the remainder of the DC-DC converter modules as a slave DC-DC converter module based on the desired output voltage and the monitored master input voltage and the monitored slave input voltage associated with each of the slave DC-DC converter modules; and
a signal generation module configured to generate the control signal including one or more instructions for indicating a desired output voltage, designating a DC-DC converter module from the plurality of DC-DC converter modules as a master DC-DC converter module, and designating each of a remainder of the DC-DC converter modules as a slave DC-DC converter module.

15. The reconfigurable DC interface of claim 9, wherein the master DC-DC converter module comprises:
a master input control terminal configured to receive the control signal from the controller;
a master voltage input terminal configured to receive the master input voltage from the first power source;
a first digital processing circuitry configured to convert the master input voltage to the master output voltage;
a first voltage output terminal configured to output the master output voltage; and
a first reference terminal configured to provide the master output voltage to each of the slave DC-DC converter modules.

16. The reconfigurable DC interface of claim 15, wherein the slave DC-DC converter module comprises:
a slave input control terminal configured to receive the control signal from the controller;
a slave voltage input terminal configured to receive the slave input voltage from the respective power source;
a slave digital processing circuitry configured to convert the slave input voltage to the slave output voltage;
a slave voltage output terminal configured to output the slave output voltage; and
a slave reference terminal configured to receive the master output voltage from the first reference terminal of the master DC-DC converter module.

17. A reconfigurable DC interface system, comprising:
a controller configured to receive a controller input signal from a device to provide a desired output voltage and issue a control signal, the control signal including one or more instructions for indicating the desired output voltage;
a first DC-DC converter module configured to
receive a first input voltage from a first power source,
receive the control signal from the controller,
convert the first input voltage to a first output voltage based on the desired output voltage, and
provide the first output voltage to a second DC-DC converter module; and
the second DC-DC converter module configured to
receive, from a second power source, a second input voltage,
receive, from the controller, the control signal based on the desired output voltage, and
convert, based on the first output voltage provided by the first DC-DC converter module, the second input voltage to a second output voltage that is substantially equal to the first output voltage.

18. The reconfigurable DC interface system of claim 17, further comprising an energy storage DC-DC converter module configured to:
receive an energy storage input voltage;
convert the energy storage input voltage to an energy storage output voltage; and
provide the energy storage output voltage to a bidirectional energy storage component configured to store energy while the energy storage component is being charged and configured to discharge energy while the energy storage component is being discharged.

19. The reconfigurable DC interface system of claim 17, further comprising:
a voltage supply output terminal configured to
receive the first output voltage from the first dc-dc converter module and the second output voltage from the second dc-dc converter module such that the first output voltage and the second output voltage are combined to produce a combined output voltage, and
provide the combined output voltage to an electrical component electrically coupled to
the voltage supply output terminal.

20. The reconfigurable DC interface system of claim 19, further comprising a switching circuitry configured to:
receive a combined output voltage comprising the first output voltage from the first dc-dc converter module and the second output voltage from the second dc-dc converter module
selectively provide, via a voltage supply output terminal of the switching circuitry, the combined output voltage to an electrical component coupled to the first switching voltage output terminal when the switching circuitry is activated; and
selectively provide, via an energy storage voltage output terminal of the switching circuitry, the combined output voltage to the energy storage DC-DC converter module coupled to the energy storage voltage output terminal as the energy storage input voltage when the switching circuitry is deactivated.

* * * * *